Aug. 31, 1943.  E. M. GREEN  2,328,006
ENGINE LUBRICATOR
Filed Jan. 3, 1942

INVENTOR.
Emmet M. Green
BY Leonard L. Kalish

Patented Aug. 31, 1943

2,328,006

UNITED STATES PATENT OFFICE 2,328,006

ENGINE LUBRICATOR

Emmet M. Green, Los Angeles, Calif.

Application January 3, 1942, Serial No. 425,488

6 Claims. (Cl. 123—196)

The present invention relates to lubricators and it relates more particularly to lubricators adapted for upper-cylinder lubrication of internal combustion engines. The present invention also relates to certain new and useful siphon means for viscous fluids.

An object of the present invention is to provide a lubricator adapted for engine head and valve lubrication which will accomplish both lubrication and solvent treatment of the engine parts efficiently and in accordance with the need for such treatment. Another object of the present invention is to provide an upper-cylinder lubricator which will supply lubricant and/or solvent at pre-determined intervals.

Another object of the present invention is to provide siphon means for viscous liquids which will be more efficient and which will prevent entrapment of air in the siphon.

Other objects and purposes of the present invention are apparent in the specification, appended claims and accompanying drawing.

The present application is a continuation-in-part of my co-pending application Serial No. 396,817 filed June 6, 1941.

The lubricator of the present invention is adapted to supply lubricant and/or solvent to the head and valves of an internal combustion engine, more efficiently and in more direct relationship with the need of these parts for such lubrication and/or solvent treatment.

In old-type lubricators such as were in use prior to the present invention, lubricant was supplied to the air intake of the engine either continuously during operation of the engine or in a single charge at the start of engine operation. The latter type of lubricator, namely one which delivers a single charge of lubricant at (and for a short period after) the start of engine operation is exemplified by my co-pending application Serial No. 256,146 filed February 13, 1939.

As shown in my co-pending application Serial No. 394,690 filed May 22, 1941, there has also been developed a lubricator which will provide either a single charge of lubricant at the start of engine operation or a continuous supply of lubricant.

By employing the lubricator covered by my co-pending application Serial No. 396,817 filed June 6, 1941, it was possible, for the first time, to supply intermittent charges of lubricant to the engine head and valves; the intermittent charges being furnished during and controlled by operation of the engine. Since the need for lubrication and/or solvent treatment of the engine head and valves is dependent primarily upon length of operation, the novel lubricator described in my co-pending application Serial No. 396,817 was successful in supplying such lubricant and/or solvent in direct relationship with the requirements of the parts. Furthermore, since a continuous addition of upper-cylinder lubricant and/or solvent (as supplied by certain old-type lubricators) is not necessary and is wasteful, the lubricator of my co-pending application Serial No. 396,817 is more economical and efficient than old-type lubricators.

It has been found, however, that certain difficulties may be encountered in a siphon-operated lubricator when liquids having relatively high viscosity are employed. The present invention eliminates these difficulties and provides a lubricator which will function efficiently and dependably regardless of the viscosity of the liquid lubricant and/or solvent to be added. The present invention in its broad aspects also covers new and useful improvements in the general field of siphoning of viscous liquids by providing siphon means which cannot be prematurely restarted due to entrainment of air in the siphon tube.

For the purpose of illustrating the invention, there are shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1:
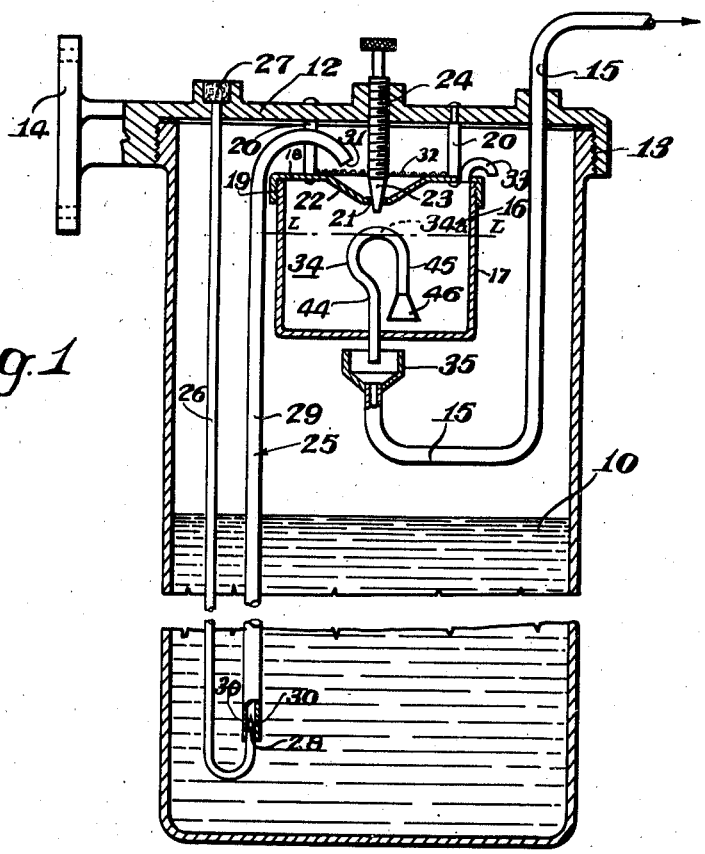
Figure 1 represents a vertical cross-sectional view of one embodiment of the present invention.

In one embodiment of my present invention, I may provide a container 11 closed at its top by a suitable cap 12 which may have a screw-threaded connection at 13 with the container proper. The container 11 contains a body of lubricant 10 from which successive charges are taken for intermittent delivery to the engine. The device may be supported at the rear of an automobile engine, as on the usual body panel, in any suitable manner, as for example by a bracket 14 formed integrally with the cap 12. Lubricant is delivered to the engine through a conduit 15 which may connect into the engine manifold, not shown, or at any other suitable location, and through which the engine-created suction is communicated to the interior of the reservoir. It will be understood that the particular form of the container 11 and its closure 12 may be modified as desired to adapt the parts to the use of individual containers or cans in which the lubricant may be sold.

The lubricant supply chamber 16, which need consist merely of a cup-shaped container 17 and a top closure 18 screw-threaded or otherwise attached at 19 to the container 17, is mounted within the upper interior of the reservoir as by means of supports 20 suspending the chamber assembly from the cap 12 of the reservoir. During operation of the engine, lubricant is supplied from body 10 to the chamber 16 through orifice 21 in the bottom of the depressed portion 22 of the chamber cover 18, the rate of lubricant delivery into the chamber being determined by the effective size of orifice 21. In the form of the invention shown in Fig. 1, this effective orifice size may be varied to increase or decrease the rate of lubricant delivery into the supply chamber, by an adjustable needle valve 23 having a threaded stem extending at 24 through the cap 12, as illustrated.

The top surface of the supply chamber may or may not have the cavity 22 above the metering orifice 21. If used, the cavity may be regarded as forming a secondary chamber within which a predetermined or constant head of lubricant is maintained above the orifice, and from which an amount of lubricant, depending upon the volume of the cavity, will drain through the orifice to supplement the oil in the supply chamber, after the engine is stopped.

Lubricant may be elevated from the body 10 for delivery through orifice 21 to the supply chamber, by a suitable air lift or pump 25 and comprising, for example, an air inlet tube 26 extending downwardly from its communication through filtering material 27 with the atmosphere, toward the bottom of the reservoir and having a nozzle end 28 discharging into a riser tube 29. Lubricant enters tube 29 through openings 30 below the outlet or nozzle 28 of tube 26. During engine operation, the depression within the reservoir causes air to be drawn in through tube 26 and the oil entering tube 29 through openings 30, to be carried upwardly with the air stream through tube 29 and discharged at 31 directly above the cavitation 22 in the supply chamber cover. A screen 32 is placed above the orifice 21 to prevent clogging of the orifice by any solid or gummy particles present in the oil. The rate of lubricant discharge through tube 29 will be in excess of the rate of lubricant feed through orifice 21 into the supply chamber, and the excess oil simply overflows the top of the chamber and returns to the lubricant body 10. Pressure equalization between the reservoir and the supply chamber may be assured by maintaining a suitable open communication between the two, as by means of a bent tube 33 extending through the cover of the chamber.

Provision is made for automatically causing delivery to the suction line 15 of a lubricant charge accumulated to predetermined volume in the supply chamber 16 by a siphon tube indicated generally as 34. The siphon tube 34 has a long arm 44 which extends through the bottom of the chamber and discharges into the enlarged mouth 35 of conduit 15 placed directly below the outlet end of the siphon tube. The siphon tube may be centrally positioned within the supply chamber in order to bring the highest overflow point 34—a of the tube in alinement with the vertical axis of the chamber in order to minimize variations in the quantity of charge siphoned through the tube, as might result from inclining or tipping of the chamber.

The short arm 45 of the siphon tube 34 is provided, at its lower free end, with an enlarged tip 46 which may be conical or funnel-shaped.

It has been found that the enlarged tip 46 which, at its widest point, has a cross-sectional area several times that of the remainder of the siphon tube 34, is highly desirable where relatively viscous liquids are to be delivered through the siphon.

Where the enlarged tip 46 is omitted so that the lower free end of the short arm 45 has the same relatively small cross-sectional area as the remainder of the siphon tube 34, the siphon has a tendency to restart (after an initial siphoning operation has been completed) before the liquid in the chamber 17 has reached the proper level L—L corresponding to the overflow level 34—a of the siphon tube 34.

An explanation for this, which I advance as a hypothesis without, in any way, limiting the validity or scope of the present invention thereby, is as follows: Where viscous liquids are being siphoned through the siphon tube and where the short arm has a relatively small cross-sectional area throughout its length, air is admitted to the short arm of the siphon tube when the liquid level in the container 17 drops below the end thereof. Due to the high viscosity of the liquid, there is a tendency for some of this air to become entrained in the oil within the siphon tube and finally to be elevated above the overflow point 34—a while some of the lubricant still remains in the short arms of the siphon tube. The siphon tube thus contains alternate pockets of air and liquid and, as a result, the siphoning action stops while some slugs of oil still remain in both the short and long arms of the siphon tube. That is, a more or less static balance is reached within the siphon with a certain amount of air entrapped at the bend of the siphon, at the point 34—a and with slugs or pockets of liquid below the point 34—a in both of the arms of the siphon. Thus, the siphon is not completely cleared of liquid as it should be in normal operation.

When the liquid level within the container again starts to rise due to the action of the air lift, it will exert a pressure against the oil slug remaining in the short arm of the siphon and cause the slug in the short arm to be elevated while the corresponding and balancing slug in the long arm is forced downward. When the slug in the short arm reaches the point 34—a, the siphon will be restarted even though the liquid level within the container 17 is considerably below the proper overflow (shown at L—L in Figure 1). Thus, the siphon empties the small amount of oil in the container 17 prematurely.

It can be seen, therefore, that this condition would result in small additions of lubricant at very short intervals rather than larger additions of oil at considerably longer intervals of engine operation.

I have found that by employing the tip 46 having a considerably enlarged cross-sectional area, the weight of the extra liquid present in the short arm of the siphon is sufficient, when air is first admitted through the lower end thereof, to overcome the tendency of the characteristic surface tension in relatively more viscous liquids to hold liquid suspended or entrained in the tube, so that all liquid in the short arm will drop back into the container 17. By reason of the enlarged tip 46, the total volume of the short arm becomes more or less approximately equal to the volume of the long arm. Thus a sufficiently large displacement of air is provided in the short arm of the siphon so that even if a subsequent entrapment of this air should occur, due to the weight of oil remaining in the long arm of the siphon, there will be a sufficient volume of air completely to purge the long arm of the siphon of liquid while the process of emptying the container 17 progresses. When the long arm of the siphon is completely emptied of liquid, the liquid level in the short arm will drop immediately to the level of liquid within the container 17. Thus, the siphon cannot be restarted until the liquid in the container 17 has reached the proper level L—L shown in Figure 1.

I have found that this results in complete regularity and reliability of siphon delivery regardless of the viscosity of the lubricant and/or solvent being delivered.

Figure 2:
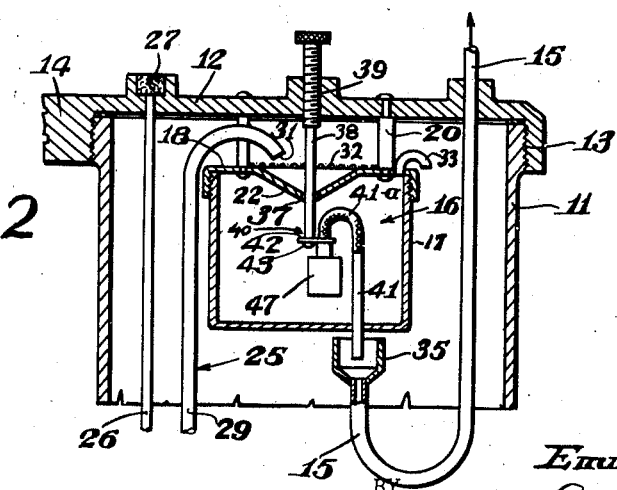
Figure 2 represents a fragmentary vertical cross-sectional view similar to that of Figure 1 but showing a somewhat different embodiment of the present invention.

In Figure 2, an alternative form 47 of enlarged tip for the short end of the siphon tube is shown. The portion 47 is generally cylindrical and has a cross-sectional area several times that of the remainder of the siphon tube so that the weight of the liquid in the short arm is sufficiently great completely to break the siphon as soon as air is admitted through the lowermost open end thereof.

Instead of having merely the lowermost tip of the short arm enlarged in cross-section as shown in Figures 1 and 2, it is possible to make the entire short arm with a relatively large cross-sectional area to ensure complete breakage of the siphon when the liquid level in the container 17 drops below the end of the short arm.

Reference has been made to the showing in Fig. 1 of an adjustable needle valve 23 for controllably varying the rate of oil flow into the supply chamber, and the period during engine operation, required for accumulation of the charge to be delivered to the engine. The period between deliveries of successive charges may also be varied, as shown in Fig. 2, by maintaining under given pressure conditions, uniform rate of oil delivery to the supply chamber and varying in effect the volume of the chamber to be occupied by the charge before its removal by the siphon. In Fig. 2 the oil is shown to enter the supply chamber through a constant-size orifice 37 about an adjustable stem 38 threaded through the cap at 39 and connected at 40 with a flexible free end portion 41a of the siphon tube, the lower part 41 of which is rigid and affixed to the bottom wall of the chamber 17. The connection at 40 may consist typically of a projection 42 carried by the flexible tube 41a and having its under-side engaged by the head 43 of stem 38. When turned, the latter rotates within the projection 42 and elevates or lowers the bend of the tube 41, thereby varying the depth to which the lubricant must accumulate in the chamber before overflowing through the siphon.

The form of the invention shown in Fig. 2 may have an advantage for certain operating requirements, independently of the function of the siphon tube adjustment for varying the length of time required for accumulation of the charge. I refer here to the capacity of the adjustment for controllably varying the volume of the charge and the adaptability of the device to supply greater volume charges at longer intervals, or smaller volume charges at reduced intervals. As a specific illustration, where the engine is operated over an average short period of time, or with frequent startings and stoppings, it may be desirable to supply the engine with smaller volume lubricant charges, and at shorter intervals. This of course may be done simply by lowering the overflow height of the siphon to reduce the volume of the charge and correspondingly decrease the period between deliveries of successive charges.

As previously observed, the invention is particularly advantageous by reason of its mode of operation, for the delivery of lubricants which contain solvents or have solvent properties with respect to carbonaceous deposits on the engine parts to be contacted by the lubricant. Accordingly, the operating and timing characteristics of the lubricator are controlled and predetermined in contemplation of both proper lubrication and solvent treatment of the engine parts.

In operation, upon starting of the engine the depression communicated through tube 15 to the lubricator starts delivery of the oil through tube 29 and orifice 21 into the supply chamber 16, all as previously explained. In general, the point at which the lubricant charge will be delivered through the siphon tube 34 will depend upon the rate at which the charge accumulates to a predetermined quantity or volume in the supply chamber. Under normal conditions of engine operation, lubrication and solvent treatment of the engine parts are not required at intervals shorter than periods of about one hour, or even two or three hours, based on the time of continuous or actual engine operation. Valve 23 in Fig. 1, or the tube 41 in Fig. 2, therefore is adjusted accordingly. When the lubricant accumulates in the supply chamber to the level L—L of overflow through the siphon tube, the charge is delivered to the suction conduit 15 (at a rate which may be controlled by the effective size or diameter of the siphon tube) to be taken into the engine. Thereafter, a successive charge accumulates within the supply chamber, but only while the engine is operating, to be delivered at the end of a determined period or extended engine operation. As will be apparent, whatever amount of lubricant is present in the supply chamber when the engine is stopped, will remain to be supplemented by additional lubricant when the engine again starts into operation.

While the novel siphon tube of the present invention has been shown in connection with a lubricator, it may also be used in other equipment employing a siphon for intermittent delivery for relatively viscous liquids.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

The invention having been hereinabove described, what is hereby claimed as new and desired to be protected by Letters Patent is:

1. In an engine lubricator of the character described, a lubricant reservoir, a supply chamber, means operable by the engine suction for elevating lubricant from the body of lubricant in said reservoir and delivering a predetermined charge of the elevated lubricant into the supply chamber, a delivery conduit adapted to transfer lubricant to the engine, a siphon operable when the charge has been delivered to the chamber to withdraw the charge therefrom directly to said conduit for delivery to the engine, said siphon having at least a portion of its short arm substantially enlarged in cross-sectional area, and means for varying the time interval between siphoning operations.

2. In an engine lubricator of the character described, a lubricant reservoir, a supply chamber, means operable by the engine suction for elevating lubricant from the body of lubricant in said reservoir and delivering a predetermined charge of the elevated lubricant into the supply chamber, means for varying the charge of lubricant delivered to said supply chamber, a delivery conduit adapted to transfer lubricant to the engine, and a siphon operable when the charge has been delivered to the chamber to withdraw the charge therefrom directly to said conduit for delivery to the engine, said siphon having the end of its short arm substantially enlarged in cross-sectional area.

3. In an engine lubricator of the character described, a lubricant reservoir, a supply chamber, means operable by the engine suction for elevating lubricant from the body of lubricant in said reservoir and delivering a predetermined charge of the elevated lubricant into the supply chamber, a delivery conduit adapted to transfer lubricant to the engine, and a siphon operable when the charge has been delivered to the chamber to withdraw the charge therefrom directly to said conduit for delivery to the engine, said siphon having a cross-sectionally enlarged tip at the end of its short arm.

4. In an engine lubricator of the character described, a lubricant reservoir, a supply chamber, means operable by the engine suction for elevating lubricant from the body of lubricant in said reservoir and delivering a predetermined charge of the elevated lubricant into the supply chamber, a delivery conduit adapted to transfer lubricant to the engine, a siphon operable when the charge has been delivered to the chamber to withdraw the charge therefrom directly to said conduit for delivery to the engine, said siphon having an enlarged funnel-shaped tip at the end of its short arm, and means for communicating the engine suction pressure uniformly to both said chamber and the reservoir.

5. In an engine lubricator of the character described, a lubricant reservoir, a supply chamber, means operable by the engine suction for elevating lubricant from the body of lubricant in said reservoir and delivering a predetermined charge of the elevated lubricant into the supply chamber, a delivery conduit adapted to transfer lubricant to the engine, and a siphon operable when the charge has been delivered to the chamber to withdraw the charge therefrom directly to said conduit for delivery to the engine, the short arm of said siphon having a substantially greater cross-section than the long arm.

6. In an engine lubricator of the character described, a lubricant reservoir, a supply chamber, means operable by the engine suction for elevating lubricant from the body of lubricant in said reservoir and delivering a predetermined charge of the elevated lubricant into the supply chamber, a delivery conduit adapted to transfer lubricant to the engine, a siphon operable when the charge has been delivered to the chamber to withdraw the charge therefrom directly to said conduit for delivery to the engine, said siphon having at least a portion of its short arm substantially enlarged in cross-sectional area, and means for varying the length of said short arm, thereby to regulate the size of, and period between, withdrawals.

EMMET M. GREEN.